(12) United States Patent
Fukui et al.

(10) Patent No.: US 8,718,966 B2
(45) Date of Patent: May 6, 2014

(54) DAMPING TEST METHOD, CONTROL APPARATUS, HYDRAULIC SYSTEM, AND COMPUTER READABLE RECORDING MEDIUM

(75) Inventors: Atsushi Fukui, Gifu (JP); Kazuyuki Suzuki, Gifu (JP); Toshiaki Ogawa, Gifu (JP); Atsushi Mori, Gifu (JP)

(73) Assignee: NABTESCO Corporation, Tokyo (JP)

( * ) Notice: Subject to any disclaimer, the term of this patent is extended or adjusted under 35 U.S.C. 154(b) by 363 days.

(21) Appl. No.: 13/187,145

(22) Filed: Jul. 20, 2011

(65) Prior Publication Data

US 2012/0029859 A1    Feb. 2, 2012

(30) Foreign Application Priority Data

Jul. 27, 2010   (JP) ................................. 2010-168098

(51) Int. Cl.
  *G06F 19/00*  (2011.01)
  *B64C 13/40*  (2006.01)
(52) U.S. Cl.
  CPC ..................................... *B64C 13/40* (2013.01)
  USPC ........................................................ 702/114
(58) Field of Classification Search
  CPC ...................................................... B64C 13/40
  USPC ........................................................ 702/114
  See application file for complete search history.

(56) References Cited

U.S. PATENT DOCUMENTS

| | | | |
|---|---|---|---|
| 5,013,955 A * | 5/1991 | Hara et al. | 310/323.21 |
| 7,770,440 B2 * | 8/2010 | Langthaler et al. | 73/115.05 |
| 7,801,657 B2 * | 9/2010 | Piyabongkarn et al. | 701/82 |
| 2003/0065486 A1 * | 4/2003 | Sumida et al. | 702/189 |

FOREIGN PATENT DOCUMENTS

JP    2003-040199 A    2/2003

* cited by examiner

*Primary Examiner* — Bryan Bui
(74) *Attorney, Agent, or Firm* — Studebaker & Brackett PC (57) ABSTRACT

The control apparatus acquires an ideal velocity characteristic of a control surface, and the temperature of pressure oil of the actuator to be tested and the operating speed of the control surface when the actuator is attached to the control surface. The control apparatus corrects the ideal velocity characteristic of the control surface by using the pressure oil temperature and the control surface operating speed. The control apparatus sets an upper limit and a lower limit by using a predicted value for a fluctuation range for a fluctuation factor that causes a fluctuation of the control surface operating speed, with reference to the corrected ideal velocity characteristic, measures the pressure oil temperature and the operating speed by actuating the control surface, with the actuator to be tested placed in a damping mode, and determines whether the measured value falls within the range between the upper limit and the lower limit.

10 Claims, 4 Drawing Sheets

DAMPING TEST METHOD, CONTROL APPARATUS, HYDRAULIC SYSTEM, AND COMPUTER READABLE RECORDING MEDIUM

CROSS-REFERENCE TO RELATED APPLICATIONS

This application is based upon and claims the benefit of priority from Japanese patent application No. 2010-168098, filed on Jul. 27, 2010, the disclosure of which is incorporated herein in its entirety by reference.

BACKGROUND OF THE INVENTION

1. Field of the Invention

The present invention relates to a damping test method for executing a damping test for a hydraulically operated actuator for an aircraft, and a control apparatus, a hydraulic system, and a program for implementing the same.

2. Background Art

In general, an aircraft includes many moving surfaces (flight control surfaces). Among these, a primary flight control surface such as an aileron or an elevator is called a "control surface". Control surfaces are driven mainly by hydraulically operated actuators. Operating pressure oil is supplied to such actuators from an aircraft central hydraulic power source.

In order to drive control surfaces, two actuators of different hydraulic lines are ordinarily used for a single control surface (for example, see JP 2003-40199A (FIG. 1, FIGS. 10 to 14)). The reason for this is as follows: Even if one of the actuators stops functioning due to such reasons as a failure of the actuator itself or a loss or reduction in the function of the aircraft central hydraulic power source, the control surface can be driven by the other actuator of a different hydraulic line, thus preventing the aircraft from becoming unflyable.

However, when all the actuators attached to a control surface stop functioning due to a failure of the actuators or a failure of the controller, or a loss of the function of the hydraulic power source, the ability to hold the control surface still is lost, resulting in the generation of vibrations called "flutter". For this reason, the hydraulic line of each of the actuators is provided with a bypass line that connects two oil chambers provided in the actuator with each other by an orifice in the event of a function loss. When this bypass line is used, the actuator functions as a damper, thus suppressing the generation of flutter.

Hereinafter, a state where the bypass line is used and each of the actuators serves as a damping device is referred to as a "damping mode". Conversely, a state where the bypass line is not used and each of the actuators is operated is referred to as an "active mode".

Furthermore, in order for the actuators to reliably exert the damping function in the damping mode, a damping test is periodically executed in the aircraft. To execute this test, test pressure sensors are respectively disposed at ports of the oil chambers in each of the actuators. In the test, in a state where one of the actuators is placed in the damping mode, the control surfaces are first actuated at a constant speed with the other actuator, and signals from the pressure sensors are obtained at this time. Then, a damping force (for example, a pressure difference between the ports) of the actuator to be tested is calculated based on the obtained signals, and pass/fail is determined based on the calculated damping force.

The above-described pressure sensors are used only in the damping test, and are never used in a normal operation of the aircraft. Therefore, from the viewpoint of realizing cost saving and a reduction in size and weight of hydraulic lines, a method of executing a damping test without using any pressure sensors has also been proposed. In the damping test method that does not involve the use of pressure sensors, the operating speed of the actuator on the damping side is measured at the time of actuating the control surfaces with the actuator on the actuation side in the active mode, and pass/fail is determined based on the measured result.

However, in the case of the above-described damping test method that does not involve the use of pressure sensors, variations due to manufacturing tolerances of the actuators and the hydraulic lines, variations the effective working pressure in the actuator on the actuation side, measurement errors, and the like undesirably affect the measured results. Accordingly, the above-described damping test method that does not involve the use of pressure sensors has a problem in that it is difficult to provide a highly reliable result.

On the other hand, it can be considered that the above-described problems may be solved by taking measures, including, for example, increasing the safety margin in the design of the actuators and the hydraulic lines. However, this inhibits the realization of cost savings and a reduction in size and weight, leading to a result similar to that obtained when pressure sensors are used.

SUMMARY OF THE INVENTION

It is an exemplary object of the present invention to provide a damping test method, a control apparatus, a hydraulic system, and a computer readable recording medium that can solve the above-described problems and increase the reliability of a result of a damping test without using any pressure sensors.

A damping test method according to an exemplary aspect of the present invention for achieving the foregoing object is a damping test method for executing a damping test for a hydraulically operated actuator used for driving a control surface of an aircraft, the method including the steps of:

(a) acquiring an ideal velocity characteristic of the control surface that is defined by a temperature of pressure oil supplied to the actuator and an operating speed of the control surface;

(b) acquiring, in a state where at least two of the actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;

(c) correcting the ideal velocity characteristic of the control surface acquired in step (a) by using the temperature of the pressure oil of the actuator to be tested and the operating speed of the control surface acquired in step (b);

(d) setting an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the ideal velocity characteristic corrected in step (c);

(e) measuring, after execution of steps (a) to (d), a temperature of the pressure oil of the actuator to be tested and an operating speed of the control surface by actuating the control surface with the actuator not under test in a state where the pair of oil chambers of the actuator to be tested are connected with each other via the orifice; and (f) determining whether the operating speed measured in step (e) falls within a range between the upper limit and the lower limit set in step (d) at the temperature of the pressure oil measured in step (e).

According to the above-described feature, it is possible to eliminate the causes of reducing the reliability of a result obtained by a damping test conducted without using any pressure sensors, including, for example, variations due to manufacturing tolerances of the actuators and the hydraulic lines, variations in the effective working pressure of the actuator on the actuation side, and measurement errors. Therefore, according to the present invention, it is possible to increase the reliability of a result of a damping test without using any pressure sensors.

According to a preferred aspect of the above-described damping test method of the present invention, in step (d), the previously assumed fluctuation factor includes a pressure fluctuation due to a temperature change in the pressure oil in the actuator not under test, a pressure fluctuation due to a flow path resistance in a supply path of the pressure oil supplied to the actuator not under test, a measurement error in measuring a temperature of the pressure oil of the actuator to be tested, and a measurement error in measuring an operating speed of the control surface. According to this aspect, it is possible to more reliably minimize the causes of reducing the reliability of the result.

In the above-described damping test method of the present invention, it is preferable that, in step (c), the ideal velocity characteristic is corrected such that a line representing the ideal velocity characteristic of the control surface passes through a point defined by the temperature of the pressure oil of the actuator to be tested and the operating speed of the control surface. In this case, variations due to manufacturing tolerances of the actuators and the hydraulic lines can be reliably corrected.

Furthermore, in the above-described damping test method according to the present invention, it is preferable that, when the aircraft includes a plurality of hydraulic lines for supplying pressure oil to the actuators, in step (b) and step (e), the actuator not under test is driven by operating only a preset hydraulic pump in the hydraulic line that supplies the pressure oil to the actuator and suspending the operation of another actuator or actuators receiving a supply of the pressure oil from that hydraulic line. In this case, it is possible to avoid adverse effects on a testing result due to variations between the pressures generated by different hydraulic pumps and variations in the pressure supplied from the hydraulic lines.

A computer readable recording medium according to an exemplary aspect of present invention for achieving the foregoing object is a computer readable recording medium in which a program for executing, by a computer, a damping test for a hydraulically operated actuator used for driving a control surface of an aircraft is recorded, the program including instructions to cause the computer to execute the steps of:

(a) acquiring an ideal velocity characteristic of the control surface that is defined by a temperature of pressure oil supplied to the actuator and an operating speed of the control surface;

(b) acquiring, in a state where at least two of the actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;

(c) correcting the ideal velocity characteristic of the control surface acquired in step (a) by using the temperature of the pressure oil of the actuator to be tested and the operating speed of the control surface acquired in step (b);

(d) setting an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the ideal velocity characteristic corrected in step (c);

(e) measuring, after execution of steps (a) to (d), a temperature of the pressure oil of the actuator to be tested and an operating speed of the control surface by actuating the control surface with the actuator not under test in a state where the pair of oil chambers of the actuator to be tested are connected with each other via the orifice; and (f) determining whether the operating speed measured in step (e) falls within a range between the upper limit and the lower limit set in step (d) at the temperature of the pressure oil measured in step (e).

According to a preferred aspect of the above-described computer readable recording medium of the present invention, in step (d), the previously assumed fluctuation factor includes a pressure fluctuation due to a temperature change in the pressure oil in the actuator not under test, a pressure fluctuation due to a flow path resistance in a supply path of the pressure oil supplied to the actuator not under test, a measurement error in measuring a temperature of the pressure oil of the actuator to be tested, and a measurement error in measuring an operating speed of the control surface.

In the above-described computer readable recording medium of the present invention, it is preferable that, in step (c), the ideal velocity characteristic is corrected such that a line representing the ideal velocity characteristic of the control surface passes through a point defined by the temperature of the pressure oil of the actuator to be tested and the operating speed of the control surface.

Furthermore, in the above-described computer readable recording medium of the present invention, it is preferable that, when the aircraft includes a plurality of hydraulic lines for supplying pressure oil to the actuators, in step (b) and step (e), the actuator not under test is driven by operating only a preset hydraulic pump in the hydraulic line that supplies the pressure oil to the actuator and suspending the operation of another actuator or actuators receiving a supply of the pressure oil from that hydraulic line.

Furthermore, in order to achieve the foregoing object, a control apparatus according to an exemplary aspect of the present invention is a control apparatus that controls at least two hydraulically operated actuators attached to a control surface of an aircraft, the apparatus including:

a test execution portion that executes a damping test for each of the at least two actuators, wherein the test execution portion acquires an ideal velocity characteristic of the control surface that is defined by a temperature of pressure oil supplied to the actuator and an operating speed of the control surface;

acquires, in a state where the at least two actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;

corrects the acquired ideal velocity characteristic of the control surface by using the temperature of the pressure oil of the actuator to be tested and the operating speed of the control surface that have been acquired;

sets an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the corrected ideal velocity characteristic;

measures a temperature of the pressure oil of the actuator to be tested and an operating speed of the control surface by actuating the control surface with the actuator not under test in a state where the pair of oil chambers of the actuator to be tested are connected with each other via the orifice; and determines whether the measured operating speed falls within a range between the upper limit and the lower limit at the measured temperature of the pressure oil.

Additionally, a hydraulic system according to an exemplary aspect of the present invention for achieving the foregoing object is a hydraulic system used for driving a control surface of an aircraft, the system including:

at least two hydraulically operated actuators attached to the control surface; and a control apparatus that controls each of the at least two actuators and executes a damping test for each of the actuators, wherein the control apparatus acquires an ideal velocity characteristic of the control surface that is defined by a temperature of pressure oil supplied to the actuator and an operating speed of the control surface;

acquires, in a state where the at least two actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;

corrects the acquired ideal velocity characteristic of the control surface by using the temperature of the pressure oil of the actuator to be tested and the operating speed of the control surface that have been acquired;

sets an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the corrected ideal velocity characteristic;

measures a temperature of the pressure oil of the actuator to be tested and an operating speed of the control surface by actuating the control surface with the actuator not under test in a state where the pair of oil chambers of the actuator to be tested are connected with each other via the orifice; and determines whether the measured operating speed falls within a range between the upper limit and the lower limit at the measured temperature of the pressure oil.

As described above, according to the present invention, it is possible to increase the reliability of a result of a damping test without using any pressure sensors.

EXEMPLARY EMBODIMENT

Figure 1:
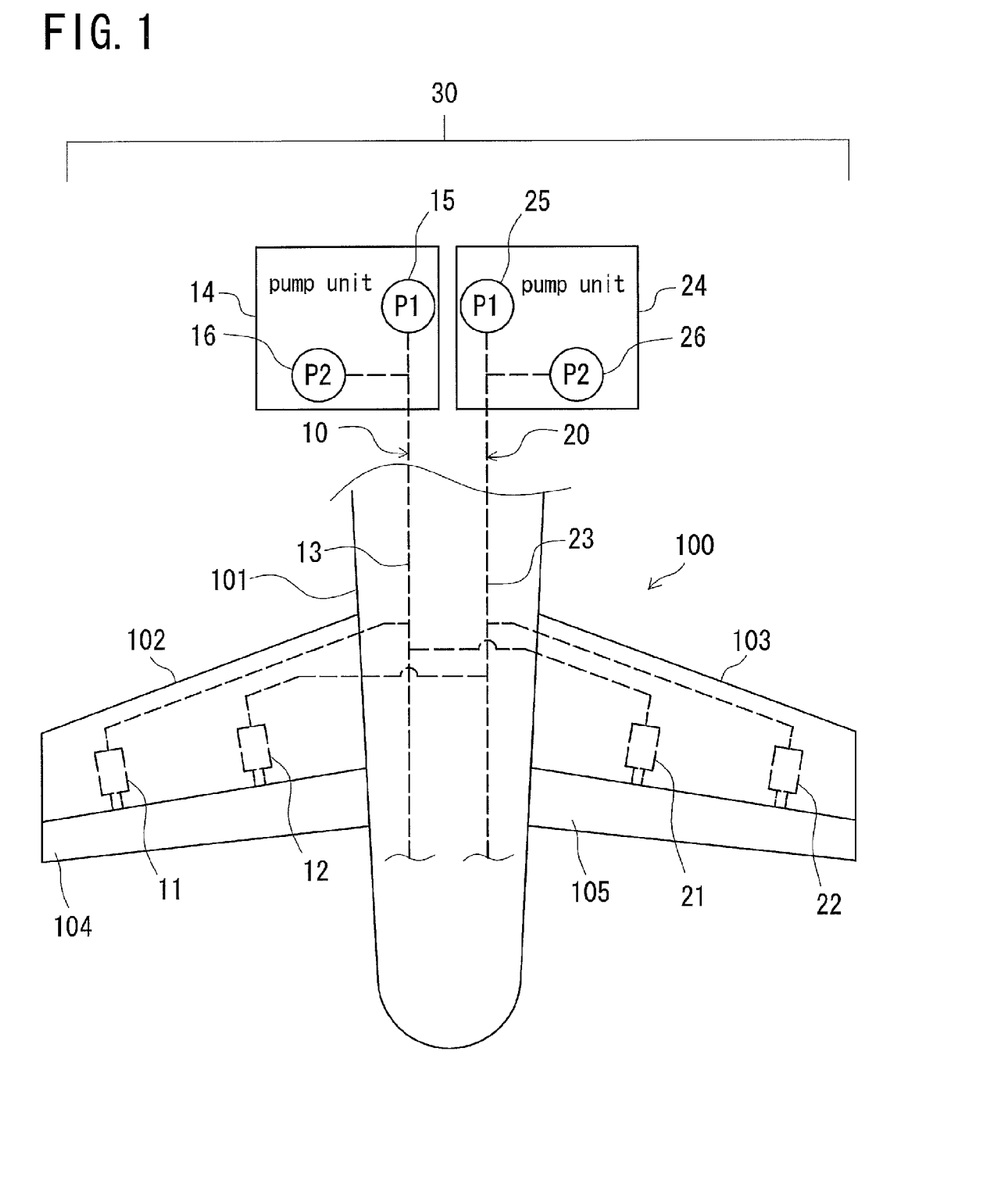
FIG. 1 is a diagram showing a state where a hydraulic system according to an embodiment of the present invention is mounted to an aircraft.

Hereinafter, a damping test method, a control apparatus, a hydraulic system, and a program according to an embodiment of the present invention will be described with reference to FIGS. 1 to 4. First, the hydraulic system of this embodiment and an aircraft on which the hydraulic system is mounted will be described with reference to FIG. 1. FIG. 1 is a diagram showing a state where the hydraulic system of an embodiment of the present invention is mounted to an aircraft.

In FIG. 1, a rear end portion of a fuselage 101 of an aircraft 100 and tailplanes 102 and 103 are shown, and the illustration of other portions of the aircraft 100 is omitted. As shown in FIG. 1, the tailplane 102 is provided with an elevator 104 as a moving surface constituting a control surface. Likewise, the tailplane 103 is provided with an elevator 105 as a moving surface constituting a control surface.

As shown in FIG. 1, at least two hydraulically operated actuators are attached to each of the elevators 104 and 105 for driving the elevators 104 and 105. In the example shown in FIG. 1, two actuators 11 and 12 are attached to the elevator 104. Likewise, two actuators 21 and 22 are attached to the elevator 105.

The actuators 11, 12, 21, and 22 constitute a hydraulic system 30 of this embodiment. In addition to these actuators, the hydraulic system 30 further includes hydraulic lines 10 and 20, and a control apparatus (see FIG. 2, not shown in FIG. 1).

The hydraulic line 10 is used for supplying pressure oil to the actuator 11 attached to the left tailplane 102 and the actuator 21 attached to the right tailplane 103. The hydraulic line 10 includes a hydraulic circuit 13 connected with the actuator 11 and 21 and a pump unit 14 serving as a hydraulic power source.

On the other hand, the hydraulic line 20 is used for supplying pressure oil to the actuator 12 attached to the left tailplane 102 and the actuator 22 attached to the right tailplane 103. The hydraulic line 20 includes a hydraulic circuit 23 connected with the actuators 12 and 22 and a pump unit 24 serving as a hydraulic power source.

Figure 2:
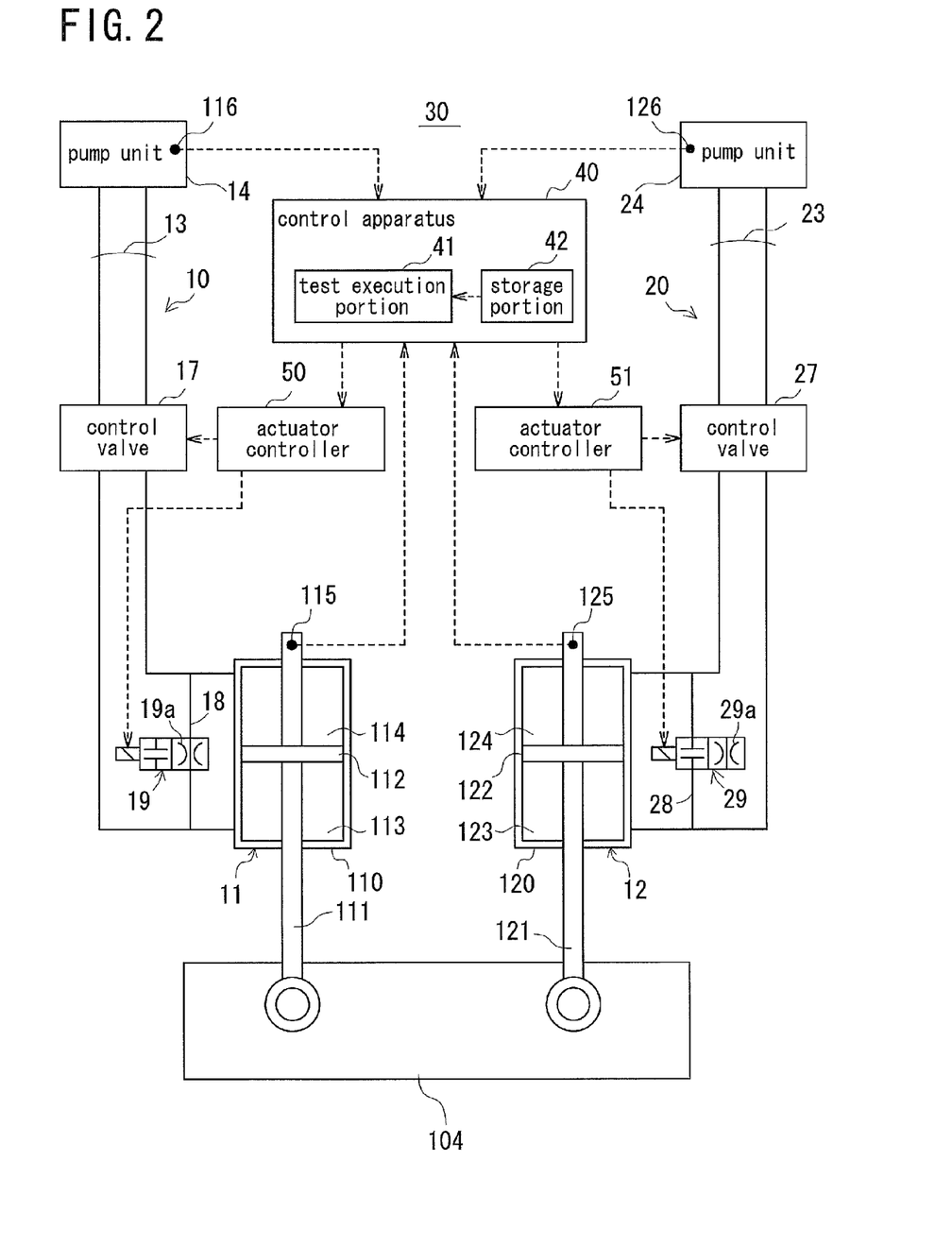
FIG. 2 is a configuration diagram schematically showing the configuration of a control apparatus and a hydraulic system according to an embodiment of the present invention.

In the hydraulic line 10, the pump unit 14 includes an engine driven hydraulic pump 15 that is driven by the aircraft engine and an electric motor driven hydraulic pump 16 that is driven by an electric motor. Likewise, in the hydraulic line 20, the pump unit 24 includes an engine driven hydraulic pump 25 that is driven by the aircraft engine and an electric motor driven hydraulic pump 26 that is driven by an electric motor. In addition, as shown in FIG. 2 described below, the pump unit 14 includes a temperature sensor 116 for measuring the temperature of the pressure oil that is to be supplied. The pump unit 24 also includes a similar temperature sensor 126.

Note that the engine driven hydraulic pump is indicated as "P1" and the electric motor driven hydraulic pump is indicated as "P2" in FIG. 1. In general, in an aircraft, the engine driven hydraulic pump is constantly operated, whereas the electric motor driven hydraulic pump is operated as needed.

Next, the configuration of the control apparatus and the hydraulic system according to this embodiment will be described with reference to FIG. 2. FIG. 2 is a configuration diagram schematically showing the configuration of the control apparatus and the hydraulic system according to an embodiment of the present invention. Note that only the actuators 11 and 12 among the actuators shown in FIG. 1 are shown in FIG. 2. Although the actuators 21 and 22 are not shown in FIG. 2, the configuration and the form of connection of these actuators are the same as those of the actuators 11 and 12.

As shown in FIG. 2, the hydraulic system 30 includes a control apparatus 40, in addition to the actuators 11 and 12 (the actuators 21 and 22 are not shown) and the hydraulic lines 10 and 20 shown in FIG. 1. The hydraulic system 30 further includes an actuator controller 50.

The actuator 11 includes a cylindrical casing 110, a piston 112 that reciprocates inside the casing 110, and a piston rod 111 that is operated in response to the piston 112. The interior of the casing 110 is divided into two spaces by the piston 112, and these two spaces serve as a pair of oil chambers 113 and 114.

When pressure oil is supplied from the pump unit 14 to one of the oil chambers 113 and 114 via the hydraulic circuit 13 and the pressure oil is then discharged from the other of the oil chambers 113 and 114, the piston 112 and the piston rod 111 move, as a result of which the elevator 104 is actuated. Further, the actuator 11 is provided with a displacement sensor 115 for measuring the amount of movement of the piston 112.

Like the actuator 11, the actuator 12 includes a casing 120, a piston 122, and a piston rod 121. Furthermore, the actuator 12 is also provided with a displacement sensor 125. Note that the configuration and the function of the actuator 12 are the same as those of the actuator 11, and therefore a further description of the actuator 12 is omitted.

As described with reference to FIG. 1, the hydraulic line 10 includes the pump unit 14 and the hydraulic circuit 13. The hydraulic circuit 13 is provided with a control valve 17. For example, the control valve 17 adjusts the amount of pressure oil supplied to the actuator 11 and switches between the oil chambers to which pressure oil is to be supplied, in accordance with a command from the actuator controller 50, which will be described below.

The hydraulic circuit 13 is provided with a bypass line 18 that can connect the oil chamber 113 and the oil chamber 114 of the actuator 11 directly with each other. Furthermore, a switching valve 19 is provided on the bypass line 18. The switching valve 19 can be switched between a state where the bypass line 18 is interrupted (interrupted state) and a state where the oil chamber 113 and the oil chamber 114 are connected with each other via an orifice 19a (connected state).

When there is no abnormality in the hydraulic line 10, the switching valve 19 switches the bypass line 18 to the interrupted state in accordance with a command from the actuator controller 50. Consequently, the actuator 11 is placed in the active mode. On the other hand, when the actuator 11 stops functioning due to a failure of itself or a failure of the controller 50 or some abnormality in the hydraulic line 10, the switching valve 19 switches the bypass line 18 to the connected state in accordance with a command from the actuator controller 50. Consequently, the actuator 11 is placed in the damping mode, in which it functions as a damping device.

As described with reference to FIG. 1, the hydraulic line 20 includes the pump unit 24 and the hydraulic circuit 23. The hydraulic circuit 23 is provided with a control valve 27. Furthermore, the hydraulic circuit 23 is provided with a bypass line 28 that can connect the oil chamber 123 and the oil chamber 124 of the actuator 12 directly with each other. A switching valve 29 is provided on the bypass line 28. The control valve 27 and the switching valve 29 are operated in accordance with a command from an actuator controller 51.

The control valve 27, the bypass line 28, and the switching valve 29 provided in the hydraulic line 20 are configured and function in the same manner as the control valve 17, the bypass line 18, and the switching valve 19, respectively, provided in the hydraulic line 10. Note that the configuration and the function of the hydraulic line 20 are the same as those of the hydraulic line 10 as mentioned above, and therefore a further description of the hydraulic line 20 is omitted.

The control apparatus 40 controls the actuators via the actuator controllers 50 and 51 in accordance with a command from the cockpit of the aircraft 100 (see FIG. 1). In this embodiment, the control apparatus 40 is a computer called a "flight controller" mounted to the aircraft 100.

The actuator controller 50 generates control signals for operating the control valve 17 and the switching valve 19 in accordance with a command from the control apparatus 40, and outputs the control signals to the control valve 17 and the switching valve 19. Likewise, the actuator controller 51 generates control signals for operating the control valve 27 and the switching valve 29 in accordance with a command from the control apparatus 40, and outputs the control signals to the control valve 27 and the switching valve 29.

The control apparatus 40 includes a test execution portion 41 that executes a damping test for the actuators and a storage portion 42 storing the information necessary for the damping test. In this embodiment, the test execution portion 41 sequentially selects at least two actuators attached to the same control surface as a test subject and executes a damping test on the test subjects.

Furthermore, the test execution portion 41 executes the damping tests without using any pressure sensors for measuring the pressure of the oil chambers of the actuators. At this time, the test execution portion 41 executes the following processes in order to suppress adverse effects on test results, caused by, for example, variations due to manufacturing tolerances of the actuators and the hydraulic lines, variations in the effective working pressure of the actuator on the actuation side, which is not under test, and measurement errors.

Specifically, the test execution portion 41 first acquires the ideal velocity characteristic of a control surface. The ideal velocity characteristic of a control surface is defined by the temperature of the pressure oil supplied to an actuator and the operating speed of the control surface. In this embodiment, the ideal velocity characteristic of the control surface is previously stored in the storage portion 42. Note that specific examples of the ideal velocity characteristic of the control surface will be described below with reference to FIG. 4.

In this embodiment, "operating speed of a control surface" means, for example, the operating speed of an actuator in the active mode, which drives the control surface, or in other words, the movement speed of the piston of the actuator in the active mode. Furthermore, when some of the at least two actuators attached to the same control surface are in the active mode and the rest are in the damping mode, the "operating speed of an actuator" may be the operating speed of the actuators in the active mode or may be the average value of the operating speed of the actuators in the active mode and the operating speed of the actuators in the damping mode.

Subsequently, the test execution portion 41 acquires the temperature of pressure oil of the actuator to be tested and the operating speed of the control surface when the actuator is attached to the control surface, for example, during production or overhaul of the aircraft.

Specifically, in a state where at least two actuators have been previously attached to the control surface and those of the actuators that are to be tested are placed in the damping mode, the control surface is actuated with the other actuators.

Then, the temperature of the pressure oil of the actuator in the damping mode and the operating speed of the control surface are measured. The measurement is carried out on an actuator-by-actuator basis by setting each of the actuators in the damping mode. The measured values are stored in the storage portion 42. Thereafter, the test execution portion 41 acquires, from the storage portion 42, the temperature of the pressure oil and the operating speed of the control surface that were measured when the actuators that are to be tested were in the damping mode.

For example, when the actuators 11 and 12 are to be tested by the damping test, the pressure oil temperature and the operating speed of the actuators 11 and 12 when the actuators 11 and 12 are attached to the elevator 104, for example, during production or overhaul of the aircraft, are sequentially measured. When the actuator 11 is tested, the test execution portion 41 acquires the pressure oil temperature of the actuator 11 and the operating speed of the control surface measured when the actuator 11 was in the damping mode.

After acquiring the ideal velocity characteristic of the control surface and the measured values obtained during production or the like described above, the test execution portion 41 corrects the ideal velocity characteristic of the control surface by using the measurement values obtained during production or the like. This correction provides an ideal velocity characteristic for which variations due to manufacturing tolerances of the actuators and the hydraulic lines, including, for example, variations in the performance of the control valve and variations in the performance of the orifice have been taken into consideration. Therefore, adverse effect of these variations on test results can be avoided. Note that a specific correction process will be described below with reference to FIG. 4.

Subsequently, upon completion of the correction, the test execution portion 41 sets an upper limit and a lower limit for the operating speed of the control surface according to the temperature of pressure oil of the actuator to be tested, with reference to the corrected ideal velocity characteristic. At this time, the test execution portion 41 performs the setting by using a predicted value for the fluctuation range for a fluctuation factor previously assumed as a factor of fluctuation of the operating speed of the control surface. In this embodiment, the predicted value for the fluctuation range is stored in the storage portion 42.

Examples of the fluctuation factor include a pressure fluctuation due to a temperature change in the pressure oil of the actuator on the actuation side, which is not under test, and similarly a pressure fluctuation (for example, filter clogging) caused by the flow path resistance in the supply path of the pressure oil supplied to the actuator on the actuation side. Further examples of the fluctuation factor include various measurement errors such as a measurement error in measuring the temperature of the pressure oil of the actuator to be tested and a measurement error in measuring the operating speed of the control surface. The fluctuation range for each fluctuation factor can be determined from the past statistics. Specific examples of the upper limit and the lower limit will be described below with reference to FIG. 4.

Subsequently, the test execution portion 41 actuates the control surface with the actuator on the actuation side in a state where the actuator to be tested is set in the damping mode, and measures the temperature of the pressure oil of the actuator to be tested and the operating speed of the control surface at this time. In this embodiment, it is assumed that the test execution portion 41 measures the pressure oil temperature and the operating speed based on signals from the displacement sensor 115 and the temperature sensor 116.

Thereafter, the test execution portion 41 determines whether the measured operating speed falls within the range between the upper limit and the lower limit at the measured pressure oil temperature. If it falls within the range, the test execution portion 41 determines that the actuator that has been tested passes the damping test. If it does not fall within the range, on the other hand, the test execution portion 41 determines that the actuator that has been tested fails the damping test.

In this way, the determination whether the damping test is passed or failed is performed based on the previously set upper limit and lower limit. Since the upper limit and the lower limit are set taking into consideration a fluctuation factor that causes a fluctuation of the operating speed of the control surface, adverse effects due to variations in the effective working pressure of the actuator on the actuation side, measurement errors, and the like on test results can be suppressed.

Figure 3:
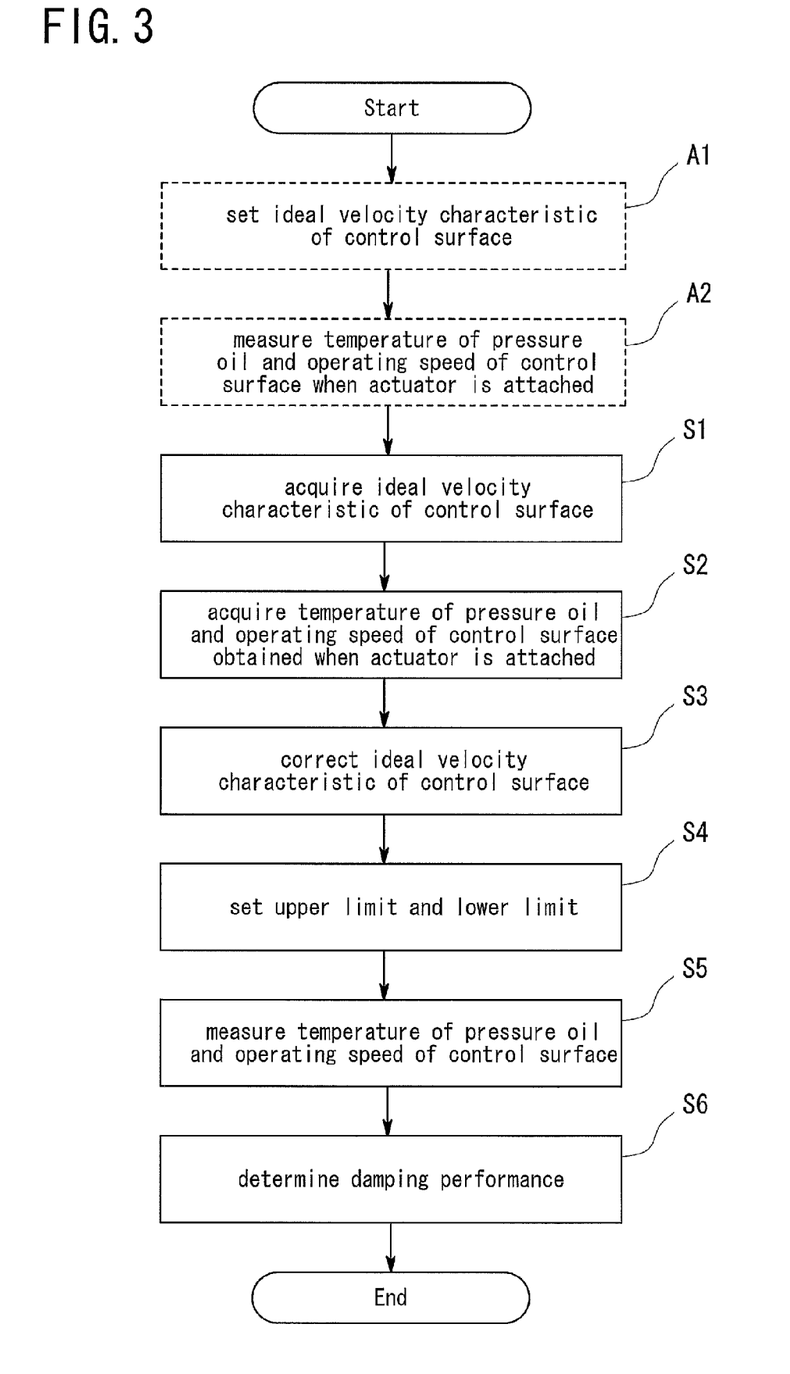
FIG. 3 is a flowchart illustrating a damping test method according to an embodiment of the present invention.
Figure 4:
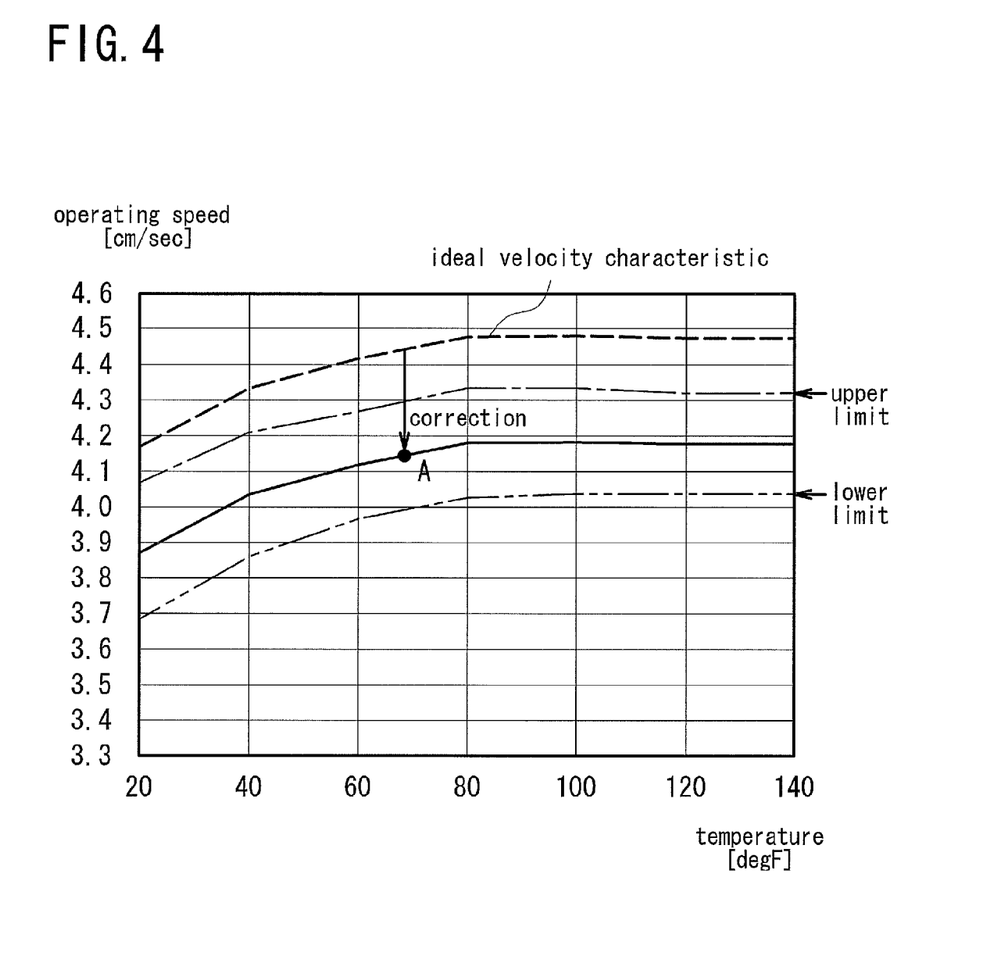
FIG. 4 is a graph showing an example of the ideal velocity characteristic for a control surface set in an embodiment of the present invention and specific examples of the processes shown in FIG. 3.

Next, a damping test method according to this embodiment will be described with reference to FIGS. 3 and 4. FIG. 3 is a flowchart illustrating the damping test method according to this embodiment of the present invention. FIG. 4 is a graph showing an example of an ideal velocity characteristic of a control surface set in this embodiment of the present invention, and specific examples of the processes shown in FIG. 3.

In FIG. 3, steps S1 to S6 are steps executed mainly by the control apparatus 40, whereas steps A1 and A2 are steps for which there is no limitation to the apparatus that mainly executes the steps. In the following description, reference is made to FIGS. 1 and 2 as needed.

First, as shown in FIG. 3, the ideal velocity characteristic is set for each of the control surfaces of the aircraft 100 (see FIG. 1) (step A1). In the example shown in FIG. 4, the ideal velocity characteristic of the control surface is set by plotting the temperature of the pressure oil supplied to the actuator on the horizontal axis and plotting the operating speed of the control surface on the vertical axis. The ideal velocity characteristic set in step A1 is stored in the storage portion 42 of the control apparatus 40. Step A1 is executed for all the control surfaces that require the actuators of the aircraft 100 to have a damping function.

Step A1 is executed by an apparatus that is different from the control apparatus 40, for example, a design computer. The ideal velocity characteristic of the control surface can be set by calculation based on the specifications of the aircraft 100 (see FIG. 1). In addition, the ideal velocity characteristic obtained by calculation may be corrected based on values obtained by testing.

In this case, a test can be executed, for example, by creating a model simulating an actual control surface and attaching at least two actuators to the model, with one of the actuators placed in the damping mode and the rest of the actuators placed in the active mode. Then, the operating speed of the control surface is measured while changing the temperature of the pressure oil.

Next, after attaching the actuators to the control surface, one of the actuators is placed in the damping mode and the control surface is actuated with the rest of the actuators. At this time, the temperature of the pressure oil of the actuator in the damping mode and the operating speed of the control surface are measured (step A2). The temperature and the operating speed measured in step A2 are also stored in the storage portion 42 of the control apparatus 40. It is assumed that in step A2, the measurement of the pressure oil temperature and the operating speed is conducted using the displacement sensor 115 and the temperature sensor 116 (see FIG. 2).

Furthermore, step A2 is executed for each of the actuators of the aircraft 100 that have the damping function.

Step A2 may be executed by the control apparatus 40, or may be executed by an apparatus other than the control apparatus 40. For example, a case is conceivable where the actuators are attached to the control surface, but the control apparatus 40 has not been mounted to the aircraft (or cannot be operated even if it is mounted) during production or overhaul of the aircraft. In this case, the operation of the actuators and the measurement of the temperature and the operating speed are conducted by an apparatus other than the control apparatus 40.

Next, the test execution portion 41 accesses the storage portion 42. Then, the test execution portion 41 acquires, from the storage portion 42, the ideal velocity characteristic set in step A1 (step S1). Subsequently, the test execution portion 41 acquires, from the storage portion 42, the pressure oil temperature and the operating speed measured in step A2 when the actuator to be tested was in the damping mode (step S2).

Next, the test execution portion 41 corrects the ideal velocity characteristic of the control surface acquired in step S1 by using the pressure oil temperature and the control surface operating speed acquired in step S2 (step S3). For example, it is assumed that the pressure oil temperature and the control surface operating speed acquired in step S2 define the point A in FIG. 4. In this case, as shown in FIG. 4, the test execution portion 41 translates the line representing the ideal velocity characteristic of the control surface in the direction of the longitudinal axis such that the line passes through the point A.

Although the correction is made based only on a single set of measurement data in step S3, this embodiment is not limited thereto. For example, it is assumed that, in step A2, a plurality of measurements are conducted for each of the actuators by varying the oil temperature, and a plurality of sets of data are stored in the storage portion 42 for each of the actuators. In this case, for example, the test execution portion 41 calculates average values of the pressure oil temperature and the control surface operating speed from the plurality of sets of measured data, and translates the line representing the ideal velocity characteristic of the control surface such that the line passes through the point defined by the average values.

Next, the test execution portion 41 sets an upper limit and a lower limit for the control surface operating speed according to the pressure oil temperature of the actuator to be tested by using the predicted value of the fluctuation range for a previously assumed fluctuation factor, with reference to the corrected ideal velocity characteristic (step S4).

For example, a pressure fluctuation due to a temperature change in the pressure oil in the actuator on the actuation side, a pressure fluctuation due to the supply path of the pressure oil supplied to the actuator on the actuation side, and a measurement error are assumed as the fluctuation factors. Also, the predicted values of fluctuation ranges (%) for the fluctuation factors are C1 [%/100], C2 [%/100], and C3 [%/100], respectively. In this case, where A represents the operating speed in the corrected ideal velocity characteristic (at any given temperature) and ΔA represents difference the between the operating speed and each of the upper limit and the lower limit, the upper limit (A+ΔA) can be expressed by Equation 1 below and the lower limit (A−ΔA) can be represented by Equation 2 below.

$$\text{Upper limit}(A+\Delta A)=A\times(1+C1)\times(1+C2)\times(1+C3) \quad \text{(Equation 1)}$$

$$\text{Lower limit}(A-\Delta A)=A\times(1-C1)\times(1-C2)\times(1-C3) \quad \text{(Equation 2)}$$

The test execution portion 41 calculates an upper limit and a lower limit on a temperature-by-temperature basis by using Equations 1 and 2 above. Thereby, as shown in FIG. 4, an upper limit and a lower limit are set for the corrected ideal velocity characteristic. Note that specific values of C1, C2, and C3 can be determined from the past statistics.

Next, after the upper limit and the lower limit are set, the test execution portion 41 actuates the control surface with the actuator on the actuation side in a state where the actuator to be tested is set in the damping mode, and measures the temperature of the pressure oil in the actuator to be tested and the operating speed of the control surface at this time (step S5).

Specifically, the test execution portion 41 first causes the switching valve corresponding to the actuator to be tested to be operated via the actuator controller, and connects the pair of oil chambers of the actuator to be tested via the orifice. Then, the test execution portion 41 causes another actuator attached to the same control surface to be operated via the actuator controller, thereby actuating the control surface.

At this time, in this embodiment, it is preferable that an actuator not under test is driven by operating a preset hydraulic pump in the hydraulic line that supplies the pressure oil to that actuator. For example, when a single hydraulic line is provided with an engine driven hydraulic pump and an electric motor driven hydraulic pump (see FIG. 1), it is preferable to use one of the hydraulic pumps. In this case, it is particularly preferable that the hydraulic pump used is the same as the hydraulic pump used in step A2. With this configuration, it is possible to avoid adverse effects caused by variations in the generated pressure between different hydraulic pumps on the test result.

Furthermore, at the time of execution of step S5, it is preferable that the hydraulic line that supplies the pressure oil to the actuator to be operated does not supply the pressure oil to another actuator that receives a supply of the pressure oil from the hydraulic line, thus suspending the operation of the other actuator. With this configuration, it is possible to avoid adverse effects on the test result caused by variations in the pressures supplied from the hydraulic line. Note that suspending supply of the pressure oil to the other actuator in this way is also preferable in step A2.

Thereafter, the test execution portion 41 specifies the upper limit and lower limit corresponding to the pressure oil temperature measured in step S5 (see FIG. 4), and determines whether the operating speed measured in step S5 is between the specified upper limit and lower limit (step S6).

If the result of the determination performed in step S6 indicates that the measured operating speed is between the upper limit and the lower limit, the test execution portion 41 determines that the actuator that has been tested passes the damping test. On the other hand, if the result of the determination performed in step S6 indicates that the measured operating speed is not between the upper limit and the lower limit, the test execution portion 41 determines that the actuator that has been tested fails the damping test.

Execution of steps S1 to S6 completes the damping test for the actuator to be tested. In this embodiment, steps S1 to S6 are executed for all the actuators of the aircraft 100 that have a damping function.

As described above, in this embodiment, factors of reducing the reliability of a damping test performed without using any pressure sensors can be eliminated. Therefore, according to this embodiment, it is possible to increase the reliability of a result of a damping test without using any pressure sensors. Consequently, it is also possible to facilitate cost saving and a reduction in size and weight of an aircraft hydraulic system.

The program according to this embodiment may be any program that causes a computer to execute steps S1 to S6 shown in FIG. 3. The control apparatus 40 and the damping test method according to this embodiment can be implemented by installing the program in a computer and executing the program.

An example of the computer is a so-called "flight controller", which is a computer mounted to an aircraft. In this case, the CPU (Central Processing Unit) of the flight controller functions as the test execution portion 41 and executes the processes. Further, a storage device, such as a memory, included in the flight controller functions as the storage portion 42. Note that the program according to this embodiment may be distributed in a state in which it is recorded in a computer readable recording medium, or may be distributed as data on the Internet.

Specific examples of the recording medium include general-purpose semi conductor storage devices such as a CF (Compact Flash) and an SD (Secure Digital), magnetic recording mediums such as a Flexible Disk, and optical recording mediums such as a CD-ROM (Compact Disk Read Only Memory).

As described above, according to the present invention, it is possible to execute a damping test for an actuator attached to a control surface of an aircraft without using any pressure sensors, and also increase the reliability of a result of the damping test. Therefore, the present invention is useful for all aircrafts for which a damping test is required for an actuator.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A damping test method for executing a damping test for a hydraulically operated actuator used for driving a control surface of an aircraft, the method comprising the steps of:
   (a) acquiring an ideal velocity characteristic of the control surface that is defined by a temperature of pressure oil supplied to the actuator and an operating speed of the control surface;
   (b) acquiring, in a state where at least two of the actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;
   (c) correcting the ideal velocity characteristic of the control surface acquired in step (a) by using the temperature of the pressure oil of the actuator to be tested and the operating speed of the control surface acquired in step (b);
   (d) setting an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the ideal velocity characteristic corrected in step (c);
   (e) measuring, after execution of steps (a) to (d), a temperature of the pressure oil of the actuator to be tested and an operating speed of the control surface by actuating the control surface with the actuator not under test in a state where the pair of oil chambers of the actuator to be tested are connected with each other via the orifice; and
   (f) determining whether the operating speed measured in step (e) falls within a range between the upper limit and the lower limit set in step (d) at the temperature of the pressure oil measured in step (e).

2. The damping test method according to claim 1, wherein, in step (d), the previously assumed fluctuation factor comprises a pressure fluctuation due to a temperature change in the pressure oil in the actuator not under test, a pressure fluctuation due to a flow path resistance in a supply path of the pressure oil supplied to the actuator not under test, a measurement error in measuring a temperature of the pressure oil of the actuator to be tested, and a measurement error in measuring an operating speed of the control surface.

3. The damping test method according to claim 1, wherein, in step (c), the ideal velocity characteristic is corrected such that a line representing the ideal velocity characteristic of the control surface passes through a point defined by the temperature of the pressure oil of the actuator to be tested and the operating speed of the control surface.

4. The damping test method according to claim 1, wherein the aircraft comprises a plurality of hydraulic lines for supplying pressure oil to the actuators, and, in step (b) and step (e), the actuator not under test is driven by operating only a preset hydraulic pump in the hydraulic line that supplies the pressure oil to the actuator and suspending the operation of another actuator or actuators receiving a supply of the pressure oil from that hydraulic line.

5. A non-transitory computer readable recording medium in which a program for executing, by a computer, a damping test for a hydraulically operated actuator used for driving a control surface of an aircraft is recorded, the program comprising instructions to cause the computer to execute the steps of:
   (a) acquiring an ideal velocity characteristic of the control surface that is defined by a temperature of pressure oil supplied to the actuator and an operating speed of the control surface;
   (b) acquiring, in a state where at least two of the actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;
   (c) correcting the ideal velocity characteristic of the control surface acquired in step (a) by using the temperature of the pressure oil of the actuator to be tested and the operating speed of the control surface acquired in step (b);
   (d) setting an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the ideal velocity characteristic corrected in step (c);
   (e) measuring, after execution of steps (a) to (d), a temperature of the pressure oil of the actuator to be tested and an operating speed of the control surface by actuating the control surface with the actuator not under test in a state where the pair of oil chambers of the actuator to be tested are connected with each other via the orifice; and (f) determining whether the operating speed measured in step (e) falls within a range between the upper limit and the lower limit set in step (d) at the temperature of the pressure oil measured in step (e).

6. The non-transitory computer readable recording medium according to claim 5, wherein, in step (d), the previously assumed fluctuation factor comprises a pressure fluctuation due to a temperature change in the pressure oil in the actuator not under test, a pressure fluctuation due to a flow path resistance in a supply path of the pressure oil supplied to the actuator not under test, a measurement error in measuring a temperature of the pressure oil of the actuator to be tested, and a measurement error in measuring an operating speed of the control surface.

7. The non-transitory computer readable recording medium according to claim 5, wherein, in step (c), the ideal velocity characteristic is corrected such that a line representing the ideal velocity characteristic of the control surface passes through a point defined by the temperature of the pressure oil of the actuator to be tested and the operating speed of the control surface.

8. The non-transitory computer readable recording medium according to claim 5, wherein the aircraft comprises a plurality of hydraulic lines for supplying pressure oil to the actuators, and, in step (b) and step (e), the actuator not under test is driven by operating only a preset hydraulic pump in the hydraulic line that supplies the pressure oil to the actuator and suspending the operation of another actuator or actuators receiving a supply of the pressure oil from that hydraulic line.

9. A control apparatus that controls at least two hydraulically operated actuators attached to a control surface of an aircraft, the apparatus comprising:

a test execution portion that executes a damping test for each of the at least two actuators, wherein the test execution portion acquires an ideal velocity characteristic of the control surface that is defined by a temperature of pressure oil supplied to the actuator and an operating speed of the control surface;

acquires, in a state where the at least two actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;

corrects the acquired ideal velocity characteristic of the control surface by using the temperature of the pressure oil of the actuator to be tested and the operating speed of the control surface that have been acquired;

sets an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the corrected ideal velocity characteristic;

measures a temperature of the pressure oil of the actuator to be tested and an operating speed of the control surface by actuating the control surface with the actuator not under test in a state where the pair of oil chambers of the actuator to be tested are connected with each other via the orifice; and determines whether the measured operating speed falls within a range between the upper limit and the lower limit at the measured temperature of the pressure oil.

10. A hydraulic system used for driving a control surface of an aircraft, the system comprising:

at least two hydraulically operated actuators attached to the control surface; and a control apparatus that controls each of the at least two actuators and executes a damping test for each of the actuators, wherein the control apparatus acquires an ideal velocity characteristic of the control surface that is defined by a temperature of pressure oil supplied to the actuator and an operating speed of the control surface;

acquires, in a state where the at least two actuators are attached to the control surface and a pair of oil chambers of the actuator among the actuators that is to be tested by the damping test are connected with each other via an orifice, a temperature of the pressure oil of the actuator to be tested and an operating speed of the control surface when the actuator(s) not under test actuate(s) the control surface;

corrects the acquired ideal velocity characteristic of the control surface by using the temperature of the pressure oil of the actuator to be tested and the operating speed of the control surface that have been acquired;

sets an upper limit and a lower limit for the operating speed of the control surface according to the temperature of the pressure oil by using a predicted value for a fluctuation range for a fluctuation factor previously assumed as a factor of fluctuation of the operating speed of the control surface, with reference to the corrected ideal velocity characteristic;

measures a temperature of the pressure oil of the actuator to be tested and an operating speed of the control surface by actuating the control surface with the actuator not under test in a state where the pair of oil chambers of the actuator to be tested are connected with each other via the orifice; and determines whether the measured operating speed falls within a range between the upper limit and the lower limit at the measured temperature of the pressure oil.

* * * * *